US010904207B2

(12) United States Patent
Majkowski et al.

(10) Patent No.: US 10,904,207 B2
(45) Date of Patent: Jan. 26, 2021

(54) INTELLIGENTLY ROUTING A RESPONSE PACKET ALONG A SAME CONNECTION AS A REQUEST PACKET

(71) Applicant: CLOUDFLARE, INC., San Francisco, CA (US)

(72) Inventors: Marek Przemyslaw Majkowski, Warsaw (PL); Alexander Forster, Austin, TX (US); Maciej Biłas, Warsaw (PL)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 16/397,567

(22) Filed: Apr. 29, 2019

(65) Prior Publication Data

US 2020/0344205 A1 Oct. 29, 2020

(51) Int. Cl.
*G06F 15/173* (2006.01)
*H04L 29/12* (2006.01)
*H04L 12/741* (2013.01)
*H04L 12/721* (2013.01)
*H04L 12/749* (2013.01)

(52) U.S. Cl.
CPC .......... *H04L 61/2069* (2013.01); *H04L 45/34* (2013.01); *H04L 45/38* (2013.01); *H04L 45/72* (2013.01); *H04L 45/741* (2013.01); *H04L 45/745* (2013.01); *H04L 61/2007* (2013.01); *H04L 2212/00* (2013.01)

(58) Field of Classification Search
CPC ..... H04L 12/4633; H04L 45/34; H04L 45/64; H04L 45/74; H04L 61/2567; H04L 63/1441; H04L 67/101; H04L 67/306; H04L 29/06; H04L 29/12066; H04L 45/00; H04L 45/28; H04L 45/58; H04L 45/745; G06F 9/505
See application file for complete search history.

(56) References Cited

U.S. PATENT DOCUMENTS

| 6,470,389 B1 * | 10/2002 | Chung | H04L 29/06 709/227 |
| 7,574,499 B1 * | 8/2009 | Swildens | G06F 9/505 709/202 |
| 2003/0196118 A1 * | 10/2003 | Ushiki | H04L 67/306 713/152 |

(Continued)

*Primary Examiner* — Dustin Nguyen
(74) *Attorney, Agent, or Firm* — Nicholson De Vos Webster & Elliott LLP

(57) ABSTRACT

A first edge server of multiple edge servers of a distributed edge computing network receives a request from a client device regarding a resource hosted at an origin server according to an anycast implementation. The first edge server modifies the request to include identifying information for the first edge server prior to sending the request to the origin server. The origin server responds with a response packet that includes the identifying information of the first edge server. Instead of routing the response packet to the client device directly, one of the multiple edge servers receives the response packet due to the edge servers each having the same anycast address. If the edge server that receives the response packet is not the first edge server, that edge server transmits the response packet to the first edge server, who processes the response packet and transmits the response packet to the client device.

18 Claims, 3 Drawing Sheets

(56) References Cited

U.S. PATENT DOCUMENTS

| | | | |
|---|---|---|---|
| 2006/0155872 A1* | 7/2006 | Charzinski | H04L 45/28 709/238 |
| 2007/0153782 A1* | 7/2007 | Fletcher | H04L 61/2567 370/389 |
| 2010/0057894 A1* | 3/2010 | Glasser | H04L 29/12066 709/222 |
| 2010/0153802 A1* | 6/2010 | Van der Merwe | H04L 67/101 714/748 |
| 2011/0154472 A1* | 6/2011 | Anderson | H04L 63/1441 726/11 |
| 2012/0039339 A1* | 2/2012 | Kurita | H04L 45/00 370/400 |
| 2014/0192808 A1* | 7/2014 | Thubert | H04L 45/64 370/392 |
| 2014/0241345 A1* | 8/2014 | DeCusatis | H04L 45/745 370/355 |
| 2016/0315857 A1* | 10/2016 | Lubashev | H04L 12/4633 |
| 2019/0288941 A1* | 9/2019 | Filsfils | H04L 45/74 |
| 2019/0319876 A1* | 10/2019 | Gumaste | H04L 45/28 |
| 2019/0394211 A1* | 12/2019 | Filsfils | H04L 45/34 |

* cited by examiner

INTELLIGENTLY ROUTING A RESPONSE PACKET ALONG A SAME CONNECTION AS A REQUEST PACKET

FIELD

Embodiments of the invention relate to the field of network communications; and more specifically, to intelligently routing a response packet along a same connection path as a request packet.

BACKGROUND

Internet hosts are concerned with maintaining high security, performance, and reliability of their hosted resources, such as websites. As the popularity of a resource increases, so does the amount of network traffic that is directed to the resource. Conventionally, when an internet host receives a request for a resource, the internet host sends the response directly to the requesting device, in a process called direct server return.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
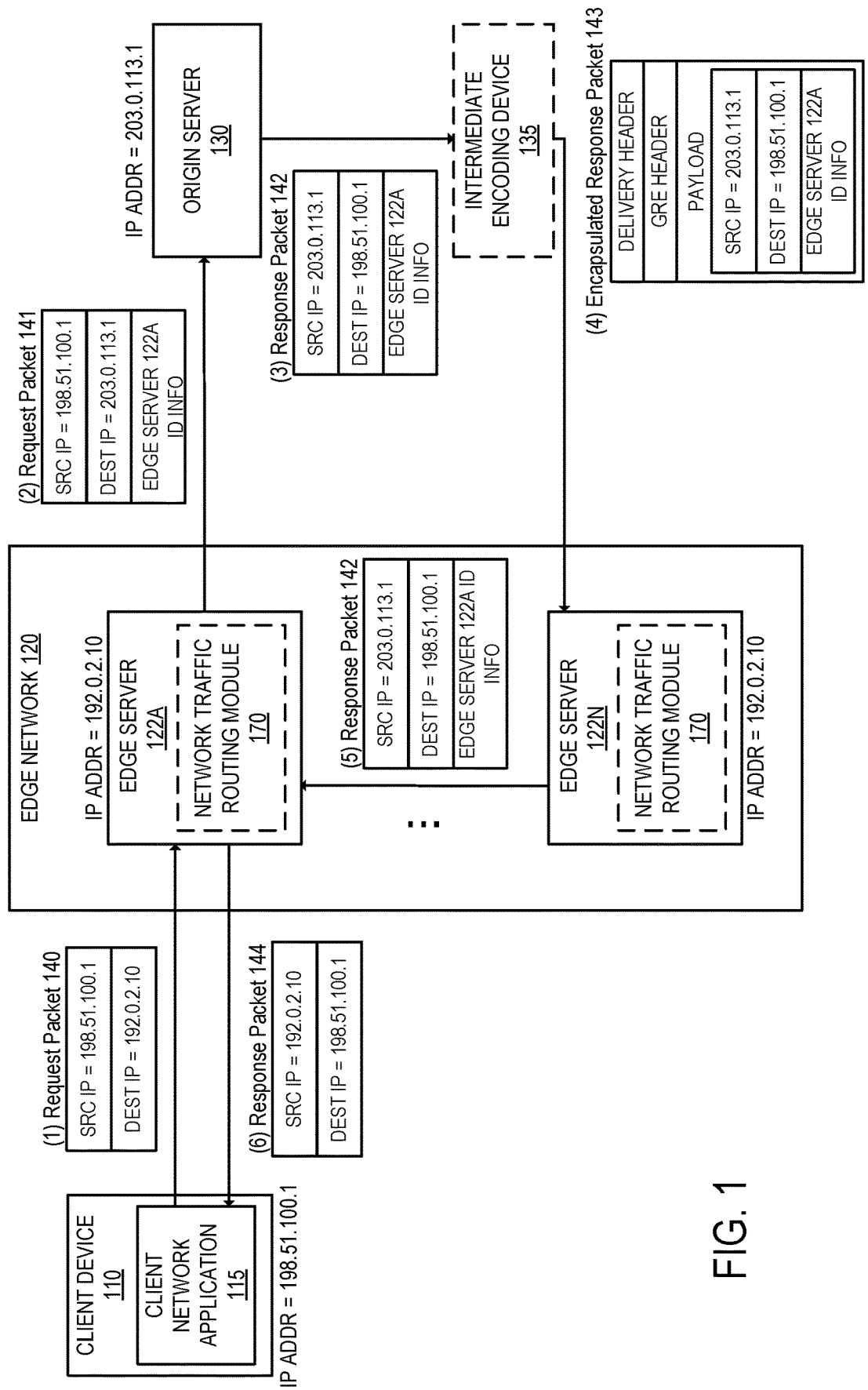
FIG. 1 illustrates an exemplary system according to some embodiments described herein.

A first edge server of multiple edge servers of a distributed edge computing network receives a request (e.g., a request packet) from a client device regarding a resource that is hosted at an origin server. In an embodiment, each of the multiple edge servers is sharing the same IP address by using anycast routing and the first edge server receives the request packet because it is closest to the requesting client device according to an anycast implementation. The first edge server processes the request packet and modifies it to include identifying information for the first edge server prior to sending the request packet to the origin server. For example, the edge server includes an ID associated with the first edge server in a modified header of the request. The edge server then sends the request packet with the modified header to the origin server, where the request packet is spoofed to appear to come from the client device. The origin server processes the request packet and responds with a response packet that includes the identifying information of the edge server. Instead of the response packet being routed to the client device directly, any one of the multiple edge servers may receive the response packet. In one embodiment, any one of the multiple edge servers may receive the response packet due to the multiple edge servers each having the same anycast IP address. If the edge server that receives the response packet is not the one that received the request packet (as indicated by the edge server identifying information included in the response packet), that edge server transmits the response packet to the first edge server (the edge server that received the request packet). The first edge server processes the response packet and transmits the response packet to the requesting client device.

In an embodiment, the request packet is modified with information identifying the edge server in a way in which that identifying information is included in a response packet. For example, for an IPv4 request packet, the IPv4 source-routing option is used to tag the request with ID information for edge server that is expected to be included in a response packet from the origin server. As another example, for an IPv6 request packet, the IPv6 flow-label is used to tag the request with ID information for the edge server that is expected to be included in a response packet from the origin server. In one embodiment, for this mechanism to operate, the origin server enables a flow-label reflection feature.

In an embodiment, the response packet is received at the edge server network instead of the client device directly because an intermediate networking device (e.g., a router) connected to the origin server is configured to send some or all packets having a source IP address of the origin server to the edge server network instead of the client device directly. For instance, the intermediate networking device may use Generic Routing Encapsulation (GRE) encoding to send such packets to the edge server network. In another embodiment, the intermediate networking device is configured to send some of the packets having a source IP address of the origin server, e.g., those packets having the edge server identification information, to the edge server network instead of the client device directly.

In an embodiment, the response packet is received at the edge server network instead of the client device directly because a process on the origin server recognizes the edge server identifying information and sends the response to the edge server network instead of the client device directly.

In an embodiment, the response packet is received at the edge server network instead of the client device directly because a setting on a router connected to the origin server recognizes the edge server identifying information and sends the response to the edge server network instead of the client device directly.

In an embodiment, an origin server receives a request packet (e.g., a spoofed request packet) from a first edge server, where the spoofed request packet is based on an original request packet from a client device requesting for an action to be performed on a resource that is hosted at the origin server. The first edge server is one of a plurality of edge servers that each have a same anycast IP address. In an embodiment, the spoofed request packet has a source address of the client device and a header including information identifying the first edge server in a way that it is expected that a response packet from the origin server will include the information that identifies the first edge server. The origin server generates the response packet, where the response packet includes the information identifying the first edge server to direct the response to the first edge server instead of the client device. The origin server also includes a destination IP address of the client device in the response packet. The origin server sends the response packet in response to the original request packet. In an embodiment, the response packet is received by an intermediate encoding device that encapsulates the response packet for sending to a destination IP address.

In conventional security solutions, an origin server receives a request from a client device through an intermediate device (e.g., an edge server or load balancer). After processing the request from the client device, the origin server routes the response directly to the network address of the requesting client device (e.g., the source IP address of the client device), bypassing the intermediate device. Thus, the request traffic and response traffic are transmitted along different network paths. The connection path for the response from the origin server to the requesting client device is referred to as direct server return (DSR). One downside of using DSR is that while the intermediate device can perform OSI Layer 3 filtering on the request traffic received from the client device, OSI Layer 7 filtering and improvements cannot be performed on the response traffic because the reply or response traffic is not sent back through the same intermediate device.

Embodiments of the invention provide many technical advantages, in addition to addressing the deficiencies of previous solutions. For example, including identifying information for a particular edge server in the header of a request packet distinguishes between, response packets that should be routed back to the edge server (e.g., via the intermediate device), versus response packets that should be routed directly back to the requesting client device. Further, because the response packet is routed back to the edge server that sent the request packet, the edge server can provide additional features (e.g., inspection of the contents of connections, rewrite content, add transport layer security [TLS], etc.) that cannot be done otherwise.

FIG. 1 illustrates an exemplary network architecture that use embodiments described herein. The service illustrated in FIG. 1 includes edge network 120 that is situated between client computing device 110, origin server 130, and optional intermediate encoding device 135. Although the embodiment in FIG. 1 depicts a single client device 110, edge network 120, origin server 130, and intermediate encoding device 135, other embodiments contemplate a greater number of client devices, edge networks, and/or origin servers. In one embodiment, certain network traffic is received and processed through edge server(s) 122A-N. For example, web traffic (e.g., HTTP requests/responses, HTTPS requests/responses, SPDY requests/responses, HTTP/2 requests, responses, etc.) for domains handled by origin server 130 may be received and processed at edge server(s) 122A-N. In one embodiment, domain owners are customers of the cloud-based edge service and certain network traffic for their websites are received and processed at edge server(s) 122A-N. Although the example of FIG. 1 shows IPv4 addresses, IPv6 addresses may be used instead.

Client device 110 is a computing device (e.g., laptops, workstations, smartphones, palm tops, mobile phones, tablets, gaming systems, set top boxes, wearable devices, electronic devices, etc.) that is capable of transmitting and/or receiving network traffic. Client device 110 executes client network application 115 that is capable of transmitting and/or receiving network traffic. For example, client network application 115 may be a web browser or other application that can access network resources (e.g., web pages, images, word processing documents, PDF files, movie files, music files, or other computer files). In the example of FIG. 1, client device 110 has an IP address of 198.51.100.1.

Edge network 120 includes edge server(s) 122A-N. In some embodiments, the edge server(s) 122A-N are geographically distributed. For example, in some embodiments, the service uses multiple edge service nodes that are geographically distributed to decrease the distance between requesting client devices and content. The authoritative name servers may have a same anycast IP address and the edge servers may have a same anycast IP address (e.g., IP address 192.0.2.10). As a result, when a DNS request is made, the network transmits the DNS request to the closest authoritative name server (in terms of the routing protocol metrics). That authoritative name server then responds with one or more IP addresses of one or more edge servers within the edge service node. Accordingly, a visitor will be bound to that edge server until the next DNS resolution for the requested hostname (according to the TTL ("time to live") value as provided by the authoritative name server). In some embodiments, instead of using an anycast mechanism, embodiments use a geographical load balancer to route traffic to the nearest edge service node. In one embodiment, edge network 120 further assigns an identifier to each edge server in edge network 120 to uniquely identifies each particular edge server from the edge server(s) 122A-N. The identifier can be a name, values, or other information to specifically identify an edge server.

Origin server 130 is a computing device that may serve and/or generate network resources (e.g., web pages, images, word processing documents, PDF files movie files, music files, or other computer files). Origin server 130 may also be another edge server to the server that serves and/or generates network resources. Although not illustrated in FIG. 1, it should be understood that the network resources of origin server 130 may be stored separately from the device that responds to the requests. Origin server 130 may handle multiple domains that resolve to edge server(s) 122A-N. In the example of FIG. 1, origin server 130 has an IP address of 203.0.113.1.

Intermediate encoding device 135 is a computing device that may encapsulate/encode packets received from origin server 130. Intermediate encoding device 135 can use generic routing encapsulation (GRE) or another suitable encapsulation technique to direct packets from origin server 130 to edge network 120. Intermediate encoding device 135 is optional in some embodiments.

To perform the intelligent routing of request and response packets, the service analyzes requests received by edge server(s) 122A from client devices (e.g., client device 110) or client network application (e.g., client network application 115) operating on client devices. For instance, edge server(s) 122A include network traffic routing module 170 that is configured to receive requests to access and/or modify resources hosted by origin server 130 and modify headers for requests and/or responses. While in one embodiment, each of edge servers 122A-N include network traffic routing module 170, in another embodiment, a subset of edge servers 122A-N have network traffic routing module 170.

At operation 1, edge server 122A receives request packet 140 from client device 110. Request packet 140 has a source IP address of client device 110 (198.51.100.1) and a destination IP address of edge server 122A (192.0.2.10). Request packet 140 is received by edge server 122A as a result of a DNS for the hostname of the request resolving to an IP address of edge server 122A instead of resolving to an IP address of origin server 130. Since edge servers 122A-N are anycasted to the same IP address (192.0.2.10), request packet 140 is received at edge server 122A because it is the closest as determined by an anycast implementation.

At operation 2, edge server 122A transmits request packet 141 to origin server 130. Request packet 141 has a source IP address of client device 110 (198.51.100.1) and a destination IP address of origin server 130 (203.0.113.1). Thus, the source IP address of request packet 141 is spoofed to appear as if it is being sent by client device 110 instead of edge server 122A. Edge server 122A has also modified request packet 141 to include information that uniquely identifies edge server 122A (from edge servers 122A-N). In an embodiment, request packet 141 has been modified with information identifying edge server 122A in a way in which that identifying information is included in a response packet from origin server 130. In an embodiment, for an IPv4 packet, edge server 122A uses the IPv4 source-routing option to tag the request with ID information for edge server 122A (which is expected to be included in a response packet from origin server 130). Although FIG. 1 shows IPv4 packets, IPv6 packets may also be used. If the packet is an IPv6 packet, edge server 122A may use IPv6 flow-label to tag the request with ID information for edge server 122A (which is expected to be included in a response packet from origin server 130).

Origin server 130 receives and processes request packet 141. Origin server 130 generates and transmits response packet 142 at operation 3. Response packet 142 includes a source IP address of origin server 130 (203.0.113.1), a destination IP address of client device 110 (198.51.100.1), and the information identifying edge server 122A. In one embodiment, origin server 130 enables a flow-label reflection feature. Thus, the information identifying edge server 122A is reflected in response packet 142.

As shown in FIG. 1, the destination IP address of response packet 142 is of client device 110. However, before the response packet is received by client device 110, intermediate encoding device 135 receives response packet 142. Intermediate encoding device 135 may be a router that is part of the same local network of origin server 130 in which all outgoing packets travel through. In one embodiment, intermediate encoding device 135 operates on origin server 130. Intermediate encoding device 135 is configured to send all packets with a source of origin server 130 (e.g., having a source IP address of 203.0.113.1) to edge network 120 (e.g., directed to IP address 192.0.2.10). Intermediate encoding device 135 is configured to encapsulate each packet (e.g., using GRE encoding) and transmit the encapsulated packet to edge network 120. The original response packet including the IP address of client device 110 is preserved in the payload of the GRE encoded packet. Thus, at operation 4, intermediate encoding device 135 generates and transmits encapsulated response packet 143 to edge network 120. The delivery header of encapsulated response packet 143 is an IP header that is used as the transport protocol for the GRE encoded packet (e.g., the delivery header may include a source address of the origin server 130 and a destination address of the edge network 120). As seen in encapsulated response packet 143, the IP address of the client device 110 and the information identifying the edge server 122A are included in the payload.

One of edge servers 122A-N in edge network 120 receives encapsulated response packet 143. In one embodiment, encapsulated response packet 143 will be received by the closest one of edge servers 122A-N as determined by an anycast implementation. The edge server that receives the request packet may be different than the edge server that receives encapsulated response packet 143. In the example shown in FIG. 1, edge server 122N receives encapsulated response packet 143.

Since edge server 122N is not the edge server that received request packet 140, edge server 122N transmits the response packet to the edge server that received the request packet (edge server 122A). Edge server 122N decapsulates encapsulated response packet 143 and determines that the response packet is marked with the information identifying edge server 122A. Edge server 122N forwards response packet 142 to edge server 122A at operation 5.

Edge server 122A receives and processes response packet 142. Edge server 122A can also perform additional layer-7 filtering, including packet inspection to look in the content of packets, and look for inconsistencies, invalid or malicious commands, and/or executable programs. Assuming that edge server 122A determines to transmit the response to client device 110, at operation 6 edge server 122A transmits response packet 144 to client device 110.

Although FIG. 1 illustrates intermediate encoding device 135 sending all packets that are sourced from origin server 130 to edge network 120, in other embodiments the packets are redirected to edge network 120 differently. For instance, in an embodiment, origin server 130 includes a process (e.g., a daemon) that is configured to analyze the requests to determine if they are marked to specify the edge server identification information (e.g., through IPv4 source options or IPv6 flow-label), and if so, to send the response to the edge server network instead of the client device directly. In such an embodiment, the response packet may be encapsulated (e.g., with GRE encoding) to preserve the IP address of the client device in the response packet. In another embodiment, an intermediate networking device (e.g., a router or other networking device) that is connected to origin server 130 is configured to analyze the responses to determine if they are marked to specify the edge server identification information (e.g., through IPv4 source options or IPv6 flow-label), and if so, to send the response to the edge server network instead of the client device directly. In such an embodiment, the response packet may be encapsulated (e.g., with GRE encoding) to preserve the IP address of the client device in the response packet.

Figure 2:
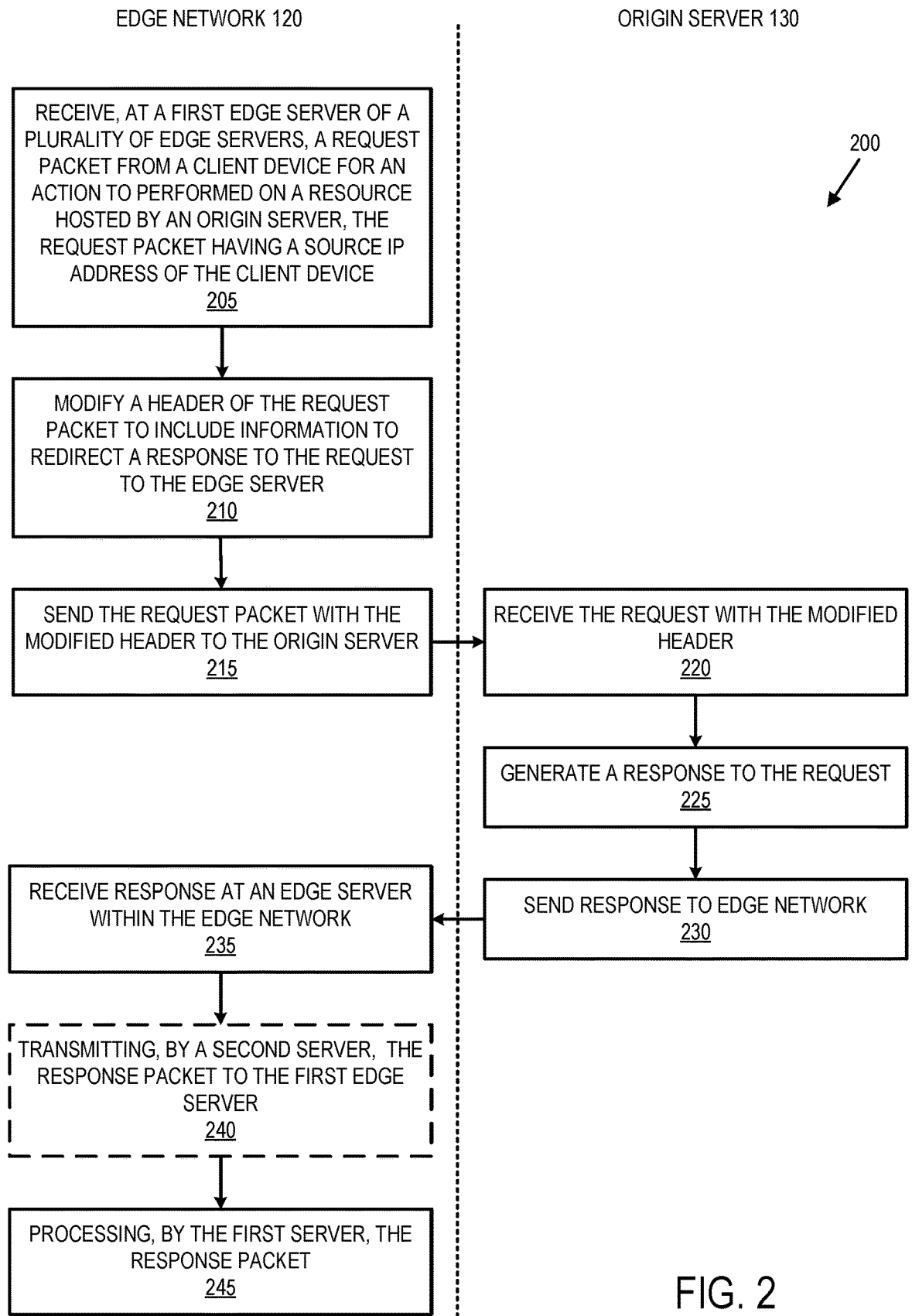
FIG. 2 is a flow diagram that illustrates exemplary operations for intelligently routing response packets along a connection path of a request packet, according to an embodiment.

FIG. 2 is a flow diagram 200 that illustrates exemplary operations for intelligently routing response packets along a connection path of a request packet according to an embodiment. The operations of FIG. 2 will be described with reference to the exemplary embodiment of FIG. 1. However, it should be understood that the operations of FIG. 2 can be performed by embodiments of the invention other than those discussed with reference to FIG. 1, and the embodiments discussed with reference to FIG. 1 can perform operations different than those discussed with reference to FIG. 2. The operations of FIG. 2 are described as being performed by one or more edge servers (e.g., edge servers 122A-N) in an edge network (e.g., edge network 120) and by an origin server (e.g., origin server 130). In some embodiment, the operations are performed by network traffic routing module 170 operating on edge server(s) 122A-N or origin server 130.

In operation 205, a first edge server (e.g., edge server 122A) of a plurality of edge servers 122A-N in edge network 120 receives request packet 140. For example, edge server 122A receives an HTTP "GET" request to access a resource hosted by origin server 130. In one embodiment, the requested resource is an HTML page located at, e.g., www.example.com. The request packet may include a request for an action to be performed on the resource. In the example depicted in FIG. 1, client network application 115 (e.g., a browser) operating on a client device (e.g., client device 110) sends request packet 140 to edge server 122A. In one embodiment, edge server 120 receives request packet 140 from client device 110 in an HTTP session.

In one embodiment, edge server 122A receives request packet 140 as a result of a DNS for the hostname resolving to an IP address assigned to edge server 122A instead of resolving to an IP address of origin server 130. Request packet 140 includes a source IP address of client device 110 (198.51.100.1) and a destination IP address of edge server 122A (192.0.2.10). Since edge servers 122A-N are anycasted to the same IP address (192.0.2.10), request packet 140 is received at edge server 122A because it is the closest as determined by an anycast implementation.

In operation 210, edge server 122A modifies a header of request packet 140 to include information that identifies edge server 122A in a way that it is expected that a response packet from origin server 130 will include the information that identifies edge server 122A. For example, FIG. 1 depicts modified request packet 141 with a header modified from the header of original request packet 140. In one embodiment, edge server 122A enters ID information for edge server 122A within a field of the header for request packet 141. The ID information can be a unique name, value, or identifier internal to edge network 120 to distinguish between edge servers 122A-N. Request packet 141 maintains the IP address of client device 110 (198.51.100.1) as the source IP address, and modifies the destination IP address to the IP address of origin server 130 (203.0.113.1). In this manner, the source IP address of request packet 141 is spoofed to appear as if it is being sent by client device 110 instead of edge server 122A.

In some embodiments, edge server 122A uses IPv4 source-routing option for IPv4 packets and IPv6 flow-label for IPv6 packets to tag the request with ID information for edge server 122A. If request packet 141 is an IPv4 packet, edge server 122A uses the IPv4 source-routing option to tag the request with ID information for edge server 122A (which is expected to be included in a response packet from origin server 130). If request packet 141 is an IPv6 packet, edge server 122A may use IPv6 flow-label to tag the request with ID information for edge server 122A (which is expected to be included in a response packet from origin server 130 when origin server 130 enables a flow-label reflection feature).

In operation 215, edge server 122A sends request packet 141 with the modified header to origin server 130. In operation 220, origin server 130 receives request packet 141.

In operation 225, origin server 130 generates a response to the request. For example, origin server generates response packet 142 with the resource requested by client device 110. In one embodiment, origin server 130 generates response packet 142 with a source IP address of origin server 130 (203.0.113.1), the destination IP address of client device 110 (198.51.100.1). In addition, because request packet 141 included the ID information for edge server 122A, e.g., the edge server from where origin server 130 received request packet 141, origin server 130 tags response packet 142 with the ID information for specific edge server 122A. The ID information for edge server 122A can be a specific tag in the response or be included in a field in the header of response packet 142.

In operation 230, origin server 130 transmits response packet 142. In one embodiment, origin server 130 first sends response packet 142 to intermediate encoding device 135. Intermediate encoding device 135 is configured to encapsulate any packets received from origin server 130, e.g., using generic routing encapsulation (GRE) or another encapsulation technique. Intermediate encoding device 135 is also configured to send the encapsulated packets to edge network 120. For example, intermediate encoding device 135 receives response packet 142 from origin server 130 and generates encapsulated response packet 143. Encapsulated response packet 143 can also include the IP address of origin server 130 and client device 110 and the information identifying the edge server 122A in its payload. Intermediate encoding device 135 then sends encapsulated response packet 143 to edge network 120 using the anycast IP address of edge servers 122A-N in edge network 120.

In another embodiment, a process (e.g., a daemon) in origin server 130, upon identifying that request packet 141 includes ID information for edge server 122A, encapsulates response packet 142 and sends encapsulated response packet 143 to edge network 120, e.g., using generic routing encapsulation (GRE) or another encapsulation technique. In such embodiments, for request packets that do not include ID information for edge server 122A, origin server 130 can direct any response packet directly to client device 110, bypassing edge network 120.

In operation 235, an edge server in edge network 120 receives the response (e.g., encapsulated response packet 143) from origin server 130. Since edge servers 122A-N have the same anycast IP address (192.0.2.10), encapsulated response packet 143 will be received by the closest one of edge servers 122A-N as determined by an anycast implementation. The edge server that receives the request packet may be different than the edge server that receives encapsulated response packet 143. For example, in FIG. 1, edge server 122N receives encapsulated response packet 143.

The edge server that receives encapsulated response packet 143, decapsulates the encoded packet to original response packet 142, identifying the destination IP address of response packet 142, e.g., the IP address of client device 110, and the ID information for edge server 122A, indicating edge server 122A as the intended destination of encapsulated response packet 143. The path of the flow diagram depends on what edge server from edge server(s) 122A-N received encapsulated response packet 143. When an edge server other than edge server 122A (e.g., edge server 122N) receives encapsulated response packet 143, the flow proceeds to operation 240. When edge server 122A receives encapsulated response packet 143, the flow proceeds to operation 245.

In some situations, edge servers 122A-N may also receive encapsulated response packets that are not intended for any edge server in edge network 120. For example, because intermediate encoding device intercepts all response packets originating from origin server 130, regardless of the original source of the request packet, and directs encapsulated response packets to edge network 120, some of those packets may not be intended for edge network 120 (e.g., they did not originate from one of edge servers 122A-N and are not marked with the ID information for one of edge servers 122A-N). In this situation, the receiving edge server in edge network 120 identifies the intended destination IP address in the header of the response packet and forwards the response packet to its intended destination.

In operation 240, when a second edge server different from the first edge server that sent the request packet to the origin server receives an encapsulated response packet, the second edge servers forwards the response packet to the first edge server. The second server identifies the first server by the ID information in the header of the response packet. In the example of FIG. 2, when edge server 122N receives encapsulated response packet 143, edge server 122N identifies the intended edge server from the ID information in the header of decapsulated response packet 142, and edge server 122N forwards response packet 142 to edge server 122A.

In operation 245, edge server 122A processes response packet 142. In one embodiment, processing response packet 142 includes identifying the destination IP address of response packet 142 (e.g., the IP address of client device 110), generating response packet 144 by removing the ID information for edge server 122A, and sending response packet 144 to client device 110. Edge server 122A can also perform additional layer-7 filtering, including packet inspection to look in the content of packets, and look for inconsistencies, invalid or malicious commands, and/or executable programs.

Figure 3:
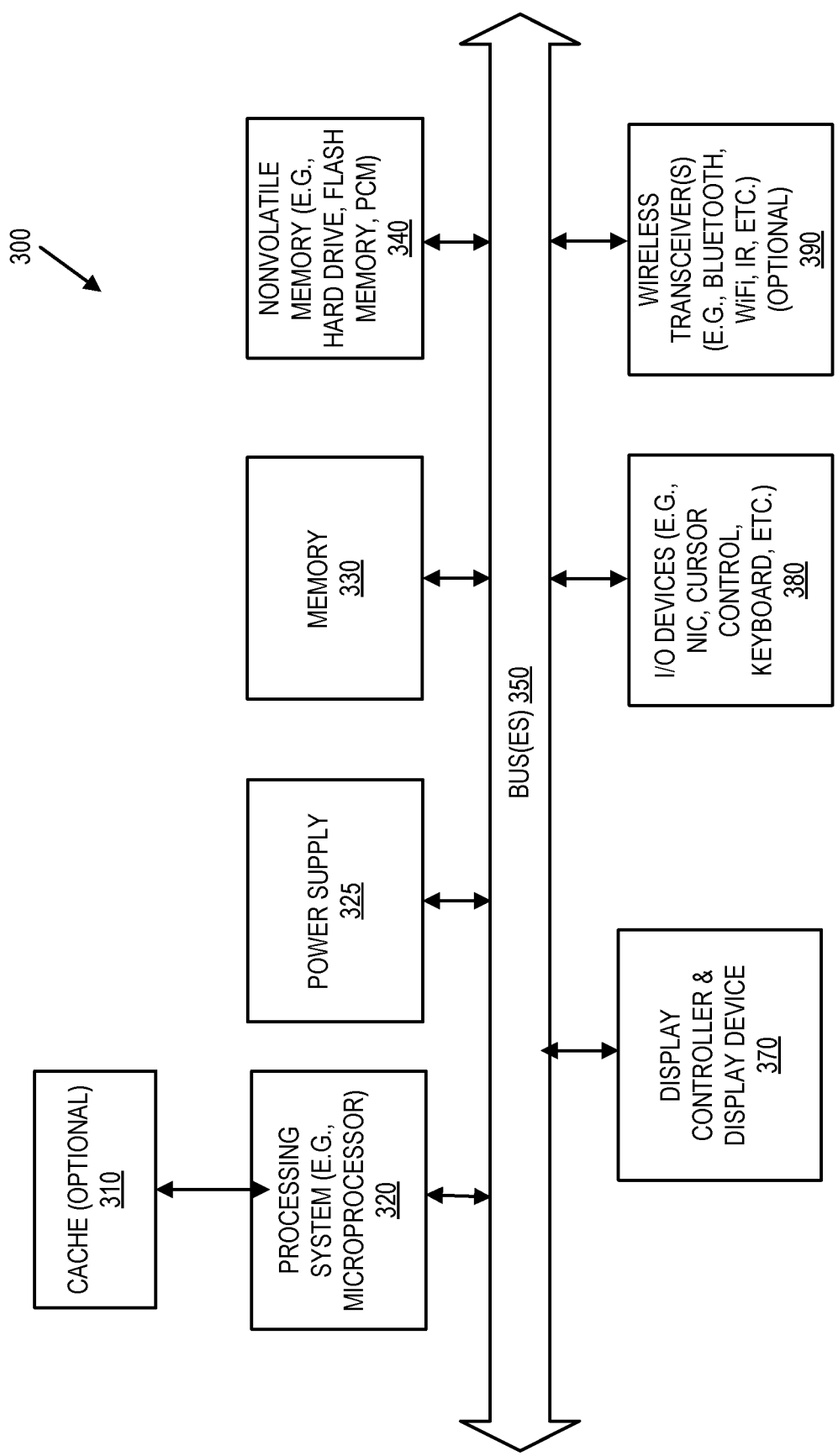
FIG. 3 is a block diagram illustrating a data processing system that can be used in an embodiment.

FIG. 3 is a block diagram illustrating a data processing system that can be used in an embodiment. As illustrated in FIG. 3, the computer system 300, which is a form of a data processing system, includes the bus(es) 350 which is coupled with the processing system 320, power supply 325, memory 330, and the nonvolatile memory 340 (e.g., a hard drive, flash memory, Phase-Change Memory (PCM), etc.). The bus(es) 350 may be connected to each other through various bridges, controllers, and/or adapters as is well known in the art. The processing system 320 may retrieve instruction(s) from the memory 330 and/or the nonvolatile memory 340 and execute the instructions to perform operations described herein. The bus 350 interconnects the above components together and also interconnects those components to the display controller & display device 370, Input/Output devices 380 (e.g., NIC (Network Interface Card), a cursor control (e.g., mouse, touchscreen, touchpad, etc.), a keyboard, etc.), and the optional wireless transceiver(s) 390 (e.g., Bluetooth, Wi-Fi, Infrared, etc.). In one embodiment, the client device, caching system, and/or service device described herein may take the form of the computer system 300.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the preceding description and the claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
receiving, by a first edge server of a plurality of edge servers, a request packet from a client device for an action to be performed on a resource that is hosted at an origin server, a header of the request packet having a source IP address of the client device, wherein each of the plurality of edge servers has a same anycast IP address;
modifying, by the first edge server, the header of the request packet to further include information that identifies the first edge server in a way that it is expected that a response packet from the origin server will include the information that identifies the first edge server;
sending, by the first edge server, the request packet with the modified header to the origin server, wherein the request packet has an IP address of the client device as a source of the request packet and the information that identifies the first edge server;
receiving, by a second edge server of the plurality of edge servers, an encapsulated response packet that includes the response packet from the origin server, the encapsulated response packet having a destination IP address of the same anycast IP address of each of the plurality of edge servers, the response packet including the information that identifies the first edge server;
decapsulating, at the second edge server, the encapsulated response packet to reveal the response packet from the origin server;
transmitting, by the second edge server, the response packet to the first edge server; and
processing, by the first edge server, the response packet.

2. The method of claim 1, wherein the encapsulated response packet is a GRE packet, the GRE packet preserving the IP address of the client device as a destination of the response packet.

3. The method of claim 1, wherein the request packet is an IPv4 request packet, and wherein a source-routing option is used to tag the request packet with the information that identifies the first edge server.

4. The method of claim 1, wherein the request packet is an IPv6 request packet, and wherein a flow-label option is used to tag the request packet with the information that identifies the first edge server.

5. The method of claim 1, wherein processing the response packet includes:
performing a packet inspection of contents of the response packet to identify one or more inconsistencies, invalid or malicious commands, and executable programs.

6. The method of claim 1, wherein processing the response packet includes:
identifying the client device as a destination of the response packet; and
sending the response packet to the client device.

7. A non-transitory machine-readable storage medium that provides instructions that, when executed by a processor, cause said processor to perform operations comprising:
receiving, by a first edge server of a plurality of edge servers, a request packet from a client device for an action to be performed on a resource that is hosted at an origin server, a header of the request packet having a source IP address of the client device, wherein each of the plurality of edge servers has a same anycast IP address;
modifying, by the first edge server, the header of the request packet to further include information that identifies the first edge server in a way that it is expected that a response packet from the origin server will include the information that identifies the first edge server;
sending, by the first edge server, the request packet with the modified header to the origin server, wherein the request packet has an IP address of the client device as a source of the request packet and the information that identifies the first edge server;
receiving, by a second edge server of the plurality of edge servers, an encapsulated response packet that includes the response packet from the origin server, the encapsulated response packet having a destination IP address of the same anycast IP address of each of the plurality of edge servers, the response packet including the information that identifies the first edge server;
transmitting, by the second edge server, the response packet to the first edge server; and
processing, by the first edge server, the response packet.

8. The non-transitory machine-readable storage medium of claim 7, wherein the encapsulated response packet is a GRE packet, the GRE packet preserving the IP address of the client device as a destination of the response packet.

9. The non-transitory machine-readable storage medium of claim 7, wherein the request packet is an IPv4 request packet, and wherein a source-routing option is used to tag the request packet with the information that identifies the first edge server.

10. The non-transitory machine-readable storage medium of claim 7, wherein the request packet is an IPv6 request packet, and wherein a flow-label option is used to tag the request packet with the information that identifies the first edge server.

11. The non-transitory machine-readable storage medium of claim 7, wherein processing the response packet includes:
performing a packet inspection of contents of the response packet to identify one or more inconsistencies, invalid or malicious commands, and executable programs.

12. The non-transitory machine-readable storage medium of claim 7, wherein processing the response packet includes:
identifying the client device as a destination of the response packet; and
sending the response packet to the client device.

13. An apparatus, comprising:
a processor;
a non-transitory machine-readable storage medium coupled with the processor that stores instructions that, when executed by the processor, cause said processor to perform the following:
receive, by a first edge server of a plurality of edge servers, a request packet from a client device for an action to be performed on a resource that is hosted at an origin server, a header of the request packet having a source IP address of the client device, wherein each of the plurality of edge servers has a same anycast IP address;
modify, by the first edge server, the header of the request packet to further include information that identifies the first edge server in a way that it is expected that a response packet from the origin server will include the information that identifies the first edge server;
send, by the first edge server, the request packet with the modified header to the origin server, wherein the request packet has an IP address of the client device as a source of the request packet and the information that identifies the first edge server;
receive, by a second edge server of the plurality of edge servers, an encapsulated response packet that includes the response packet from the origin server, the encapsulated response packet having a destination IP address of the same anycast IP address of each of the plurality of edge servers, the response packet including the information that identifies the first edge server;
transmit, by the second edge server, the response packet to the first edge server; and
process, by the first edge server, the response packet.

14. The apparatus of claim 13, wherein the encapsulated response packet is a GRE packet, the GRE packet preserving the IP address of the client device as a destination of the response packet.

15. The apparatus of claim 13, wherein the request packet is an IPv4 request packet, and wherein a source-routing option is used to tag the request packet with the information that identifies the first edge server.

16. The apparatus of claim 13, wherein the request packet is an IPv6 request packet, and wherein a flow-label option is used to tag the request packet with the information that identifies the first edge server.

17. The apparatus of claim 13, wherein processing the response packet includes:
performing a packet inspection of contents of the response packet to identify one or more inconsistencies, invalid or malicious commands, and executable programs.

18. The apparatus of claim 13, wherein processing the response packet includes:
identifying the client device as a destination of the response packet; and
sending the response packet to the client device.

\* \* \* \* \*